United States Patent Office 2,726,266
Patented Dec. 6, 1955

2,726,266

ANTIBACTERIAL COMPOSITION CONTAINING DIASTEREOISOMERS OF 1-(p-METHYLSULFONYLPHENYL)-2-(ALPHA,ALPHA-DICHLOROACETAMIDO)-1,3-PROPANEDIOL

Robert P. Piroué, Wilmington, Del., assignor to E. I. du Pont de Nemours and Company, Wilmington, Del., a corporation of Delaware No Drawing. Application May 10, 1954, Serial No. 428,839

1 Claim. (Cl. 260—562)

This invention relates to an antibacterial composition and more particularly to a complex compound consisting of two parts by weight of dl-threo-1-(p-methylsulfonylphenyl)-2-(alpha,alpha-dichloroacetamido)-1,3-propanediol and one part by weight of dl-erythro-1-(p-methylsulfonylphenyl)-2-(alpha,alpha-dichloroacetamido)-1,3-propanediol.

1-(p-methylsulfonylphenyl)-2-(alpha,alpha-dichloroacetamido)-1,3-propanediol is described and claimed in the copending U. S. application of Walter A. Gregory, Serial No. 257,986, filed November 23, 1951. The antibacterial activity of the d-threo and the dl-threo forms of 1-(p-methylsulfonylphenyl)-2-(alpha,alpha-dichloroacetamido)-1,3-propanediol is reported by Suter et al. in the J. Am. Chem. Soc. 74, 5475 (1952), and 75, 4330 (1953).

It is known that the erythro form of 1-(p-methylsulfonylphenyl)-2-(alpha,alpha-dichloroacetamido)-1,3-propanediol has substantially less activity than the corresponding threo form against such microorganisms as, for example, Brucella abortus, Salmonella typhimurium, Salmonella gallinarum, Streptococcus agalactiae, Escherichia coli, Micrococcus pyogenes, Pasturella avicida, and Klebsiella pneumoniae.

Surprisingly, I have now found that my novel complex compound containing one-third part of the inactive erythro form has on a weight basis equivalent antibacterial activity as the separate threo form. While this 33⅓ per cent gain is biological activity on a weight basis is not fully understood, it is believed that it is a synergistic phenomenon.

The intramolecular composition of my invention is a white solid, melting sharply at 168–168.5° C. It has a solubility in water at 26° C. of 1.92 grams per liter. This is in contrast to (1) the dl-threo form which melts at 180–181° C. and which has a solubility in water at 26° C. of 1.185 grams per liter, and (2) the dl-erythro form which melts at 199–199.5° C.

The complex compound of the present invention can be prepared from alpha,alpha-dichloro-N-[-2-hydroxy-1-(p-methylsulfonylbenzoyl)ethyl]acetamide using sodium borohydride. This reduction is effected in an aqueous medium or in the presence of a lower aliphatic alcohol, such as, for instance, methanol, ethanol, isopropanol, or butanol. The reaction can also be carried out in dimethylformamide, and the like.

A mixture of isomers of dl-1-(p-methylsulfonylphenyl)-2-(alpha,alpha-dichloroacetamido)-1,3-propanediol are obtained from the sodium borohydride reduction step. The mixture is fractionated by crystallization using as a solvent boiling nitromethane. Two distinct products are obtained. One is a less soluble fraction, melting at 199–200° C. after purification, and consists of erythro-dl-1-(p-methylsulfonylphenyl)-2-(alpha,alpha-dichloroacetamido)-1,3-propanediol. A more soluble fraction, which melts without purification at 166–169° C. and at 168–168.5° C. following purification.

Alpha,alpha-dichloro-N-[2-hydroxyl-1-(p-methylsulfonylbenzoyl)ethyl]acetamide can be readily prepared as described in the aforementioned Gregory application from alpha,alpha-dichloro-N-(p-methylsulfonylphenacyl)acetamide by aldol type of condensation in an alcoholic medium using aqueous formaldehyde and sodium bicarbonate. The synthesis of this ketone is also described in the aforementioned publication of Suter et al., J. Am. Chem. Soc. 75, 4330 (1953).

The complex compound of my invention can also be prepared by fractional crystallization of synthetic mixtures of threo- and erythro-1-(p-methylsulfonylphenyl)-2-(alpha,alpha-dichloroacetamido)-1,3-propanediol. When two parts by weight of threo and one part of erythro compound are dissolved in water, the complex compound of the invention crystallizes from the solution in excellent yields.

In order to better understand this invention, reference should be had to the following illustrative example:

Example

To a slurry of 88.5 grams of alpha,alpha-dichloro-N-[2-hydroxyl-1-(p-methylsulfonylbenzoyl)ethyl]acetamide in 500 ml. of water, there is added dropwise 12.5 grams of sodium borohydride in 125 ml. water over a period of about fifteen minutes. During this addition the temperature of the reaction mixture is maintained at from about 25° to 30° C. The reaction mixture is stirred for about one hour.

The progress of the reaction is followed by withdrawing aliquots from the mixture from time to time and determining their melting ranges. When the lower limit of the melting range is 162–165° C., the reaction is stopped by acidification with a mineral acid.

Fifty-eight ml. of 5 N hydrochloric acid is added dropwise to the reaction mixture over a 30 minute period. The mixture is externally cooled and about 5 ml. of Antifoam A in ethanol is added to decrease foaming.

The precipitated reaction product is collected by filtration of the mixture, washed twice with 100 ml. portions of water, and air dried to give 86 grams, M. P. 162–177° C.

80 grams of the product melting 162–177° C. is added to 400 ml. boiling nitromethane. After 5 minutes, the mixture is filtered thru a heated glass funnel. The insoluble material is collected, washed with ether and dried to 15.8 grams of impure erythro isomer, M. P. 191–194° C. Recrystallization of this impure material from acetonitrile raised the melting-point to 197–198° C.

The "nitromethane" filtrate is cooled, and crystals form. These are collected, ether-washed and air dried to give 53 grams of material melting 164.5°–178° C. This material is placed in a flask containing 225 ml. nitromethane. The nitromethane mixture is boiled for 5 minutes and then filtered thru a heated filter. About 19 grams of insoluble material which is impure erythro isomer is collected on the filter. This is further purified to give essentially pure erythro material.

The filtrate containing nitromethane and the desired complex compound is cooled and 29.3 grams of compound melting 168–168.5° C. is obtained.

The complex compound so obtained has the following chemical analysis: Calcd. for $C_{12}H_{15}Cl_2NO_5S$: C, 40.4%; H, 4.21; Cl, 19.95; N, 3.93; S, 8.98. Found: C, 40.8; H, 4.32; Cl, 19.71; N, 4.05; S, 8.98.

In boiling nitromethane, the complex compound which consists of two parts of threo isomer and one part erythro isomer has a solubility which is about twice that of the dl-threo-1-(p-methylsulfonylphenyl)-2-(alpha,alpha-dichloroacetamido)-1,3-propanediol. The melting point of the complex compound is depressed by the starting ketone to 140–142° C. The melting ranges of the complex compound with the individual erythro and threo forms are as follows:

a. Mixed with threo form 166.5–170° C.
   b. Mixed with erythro form 168–187° C.

The constituents of my intramolecular composition cannot be separated by known crystallization techniques. Crystallizations of the complex compound from water acetonitrile, ethanol or nitromethane do not change its melting point.

I claim:

A complex compound consisting essentially of two parts by weight of dl-threo-1-(p-methylsulfonylphenyl)-2-(alpha,alpha-dichloroacetamido)-1,3-propanediol and one part by weight of dl-erythro-1-(p-methylsulfonylphenyl)-2-(alpha,alpha-dichloroacetamido)-1,3-propanediol.

References Cited in the file of this patent

UNITED STATES PATENTS

| | | |
|---|---|---|
| 2,681,364 | Long et al. | June 15, 1954 |
| 2,687,434 | Long | Aug. 24, 1954 |

OTHER REFERENCES

Suter et al.: "J. Am. Chem. Soc.," vol. 75, September 5, 1953, pp. 4330–33. (Received May 15, 1953.)